United States Patent
Watson et al.

(10) Patent No.: US 11,349,647 B2
(45) Date of Patent: May 31, 2022

(54) KEY BROKER FOR A NETWORK MONITORING DEVICE, AND APPLICATIONS THEREOF

(71) Applicant: Capital One Services, LLC, McLean, VA (US)

(72) Inventors: John Watson, Falls Church, VA (US); Christopher Roosenraad, Vienna, VA (US); Peter P. Kofira, Powhatan, VA (US); Travis Scheponik, Midlothian, VA (US); Aaron Eppert, Lawrenceburg, IN (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/891,879

(22) Filed: Jun. 3, 2020

(65) Prior Publication Data

US 2021/0385071 A1   Dec. 9, 2021

(51) Int. Cl.
*H04L 29/06* (2006.01)
*H04L 9/08* (2006.01)
*H04L 43/04* (2022.01)
*H04L 9/40* (2022.01)
*H04L 9/32* (2006.01)

(52) U.S. Cl.
CPC .......... *H04L 9/083* (2013.01); *H04L 9/0891* (2013.01); *H04L 9/0894* (2013.01); *H04L 9/3263* (2013.01); *H04L 43/04* (2013.01); *H04L 63/166* (2013.01); *H04L 63/18* (2013.01)

(58) Field of Classification Search
CPC ..... H04L 9/083; H04L 9/0891; H04L 9/0894; H04L 9/3263; H04L 43/04; H04L 63/166; H04L 63/18; H04L 63/0428; H04L 63/06; H04L 9/0827; H04L 63/306
See application file for complete search history.

(56) References Cited

U.S. PATENT DOCUMENTS

| | | |
|---|---|---|
| 7,590,844 B1 | 9/2009 | Sherman et al. |
| 10,205,712 B2 | 2/2019 | Smith et al. |
| 10,326,741 B2 | 6/2019 | Rothstein et al. |
| 2013/0046993 A1 | 2/2013 | Jueneman et al. |
| 2017/0163736 A1 | 6/2017 | Jiang et al. |
| 2018/0062854 A1 | 3/2018 | Kancharla et al. |
| 2018/0191501 A1 | 7/2018 | Lindemann |
| 2018/0278419 A1* | 9/2018 | Higgins ............. H04L 9/0841 |
| 2018/0288021 A1 | 10/2018 | Basin |
| 2019/0068564 A1 | 2/2019 | Putatunda et al. |

OTHER PUBLICATIONS

International Searching Authority directed to related International Patent Application No. PCT/US21/35746, dated Oct. 18, 2021; 30 pages.

* cited by examiner

*Primary Examiner* — Yogesh Paliwal
(74) *Attorney, Agent, or Firm* — Sterne, Kessler, Goldstein & Fox P.L.L.C.

(57) ABSTRACT

A key broker monitors network traffic metadata and determines which decryption keys are required at one or more packet brokers in order to decrypt relevant traffic required by various network monitoring devices. The key broker retrieves the required keys from a secure keystore distributes them, as needed, to the network packet brokers, and dynamically updates the decryption keys stored in the network packet brokers in response to changes in network traffic.

17 Claims, 7 Drawing Sheets

KEY BROKER FOR A NETWORK MONITORING DEVICE, AND APPLICATIONS THEREOF

FIELD

Embodiments generally relate to computer network traffic monitoring and analysis.

BACKGROUND

A computer network, often referred to as a network, is an arrangement of interconnected computers in digital communication with each other. Computers in a network can share data, resources and computing power to accomplish useful tasks. Computers may send data to each other in discrete bundles of information called packets. The data sent between computers in a network may broadly be referred to as network traffic.

Networks may require some amount of management and maintenance to operate effectively. Network management systems may include devices that capture and copy packets sent between computers. The network management system may include terminal access points (TAPs) configured to capture and copy network traffic. In network management systems, network monitoring devices may receive network traffic collected using one or more TAPs. The network monitoring devices perform analysis on the received network traffic. This analysis may be useful for detecting network intrusions or detecting and resolving communications issues.

Some network management systems may include several different network monitoring devices with specific functions. A network packet broker (NPB) may be used to receive captured packets from one or more TAPs and distribute the captured packets to the appropriate network monitoring devices.

Network traffic may be encrypted, which may make it difficult for a network monitoring device to perform the analysis needed. To deal with this, network administrators may store decryption keys in a NPB. The NPB may use the decryption keys to decrypt some network traffic before distributing captured packets to the network monitoring devices. In extremely large networks with diverse traffic, network packet brokers may be incapable of storing all the keys necessary to decrypt network traffic for optimal performance of the network monitoring devices.

Systems and methods are needed to allow improved performance of the decryption of network traffic for analysis.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

As mentioned above, a network packet broker's (NPB) ability to decrypt network traffic, for analysis by network monitoring devices, may be limited, particularly with growing diversity of decryption keys corresponding to the network traffic the NPB manages. At least in part to deal with an NPB's limits, embodiments provide a system for managing distribution of decryption keys. The system includes a network terminal access point (TAP), configured to intercept a packet on a computer network, and a network monitoring device. The network monitoring device includes a key datastore and is configured to receive the intercepted packet and decrypt the intercepted packet when a corresponding decryption key is stored in the key datastore. The system further includes a secure keystore configured to store decryption keys and a key broker. The key broker is configured to receive metadata corresponding to the intercepted packet, retrieve from the secure keystore, based on the metadata, a decryption key corresponding to the intercepted packet, and provide the decryption key to the network monitoring device for storage in the key datastore. In this way, the system distributes keys and avoids the need for a single decryption device to store all the possible decryption keys.

One type of network monitoring device may be an intrusion detection system. In an embodiment, the system may further include an intrusion detection system configured to collect the metadata, corresponding to packets to be decrypted, based on a server name indication (SNI) field from network traffic, common name (CN) field, or a subject alternative name (SAN) field of a security certificate retrieved from network traffic and send the metadata to the key broker. The key broker may be further configured to store the metadata in a tracking database. In this way, the key broker gains access to the metadata indicating which decryption keys correspond to traffic flowing through an NPB.

The key broker may be further configured to store tracking data corresponding to both the network monitoring device and the decryption key provided to the network monitoring device. In this way, the key broker keeps track of which decryption keys have been distributed and the network monitoring device to which those keys are distributed.

The key broker may be further configured to store a lease time value corresponding to the decryption key. In this way, the key broker can determine when a decryption key can be safely removed from a network monitoring device.

The key broker may be further configured to remove the decryption key from the network monitoring device in response to expiration of the lease time. In this way, the key broker frees space in the key datastore so other decryption keys can be stored and used.

The key broker may be further configured to remove the decryption key from the network monitoring device based on a decryption key storage limit of the network monitoring device and a priority of the decryption key. In this way, even when key datastore limits are exceeded, the key broker can ensure that certain higher priority traffic is decrypted at the cost of not decrypting lower priority traffic.

The metadata may include domain information, an unencrypted destination corresponding to the packet, or an identifier of a security certificate corresponding to the decryption key. In this way, the metadata may be used to identify an appropriate decryption key for decrypting the network traffic.

The secure keystore may include an offline storage device. In this way, the decryption keys stored in the secure keystore are protected from intrusion attempts coming through the network.

The key broker may be further configured to receive a request from the network monitoring device and provide the decryption key in response to the request. In this way, an intelligent network monitoring device can request specific decryption keys for storage in the key datastore.

According to some embodiments, the key broker 202 may also be configured to collect and manage Diffie-Hellman ephemeral keys under the TLS 1.3 standard. The system includes an agent configured to run on an endpoint device or a server and passively collect an ephemeral key in response to a transport layer security handshake. The system also includes a secure keystore configured to store the ephemeral key, and a network terminal access point (TAP) configured to capture a packet on a computer network. The system further includes a key broker configured to receive metadata corresponding to the captured packet, retrieve the ephemeral key corresponding to the captured packet, from the secure keystore, based on the metadata, and provide the ephemeral key to a network monitoring device. In this way, the system collects, transmits, and stores ephemeral keys and manages distribution of the ephemeral keys to network monitoring devices that may require the ephemeral keys for decryption and analysis of the captured packets.

The agent may be further configured to send the ephemeral key, through out-of-band communications, to a key ingestion service. In this way, exposure of the ephemeral key is avoided during transmission of the ephemeral key from the agent.

The agent may be further configured to send key metadata to the key ingestion service using out-of-band communications, and the system may further include the key ingestion service configured to receive the ephemeral key and the key metadata, examine the key metadata using a website category service, and based on the examining of the key metadata, discard the ephemeral key according to a privacy policy or send the ephemeral key for storage in the secure keystore. In this way, the system discards ephemeral keys that correspond to network traffic, such as banking traffic, that should not be decrypted or analyzed based on the privacy policy.

The key ingestion service may be further configured to send the ephemeral key to the key broker for storage in the secure keystore. The key broker may be further configured to store the ephemeral key in the secure keystore. In this way, the key broker manages storage of ephemeral keys in addition to distribution or check-out of ephemeral keys.

The system may further include a network monitoring device configured to receive the ephemeral key, decrypt the captured packet using the ephemeral key, and perform analysis on the captured packet. In this way, the network monitoring device decrypts traffic encrypted according to the TLS 1.3 standard and provides visibility into TLS 1.3 network traffic.

The key broker may be further configured to store tracking data corresponding to the network monitoring device, the ephemeral key provided to the network monitoring device, and a lease time. In this way, the system tracks which ephemeral keys are distributed to which network monitoring devices and the amount of time that the network monitoring device is allowed to use the ephemeral key. This information may be used to create an audit trail.

The key broker may be further configured to remove the ephemeral key from the network monitoring device in response to expiration of the lease time. In this way, the key broker enforces the lease time of the ephemeral key and reduces unnecessary exposure of the ephemeral key.

The key broker may be further configured to delete the ephemeral key from the secure keystore based on a retention policy of the captured packet corresponding to the ephemeral key. In this way, the key broker deletes ephemeral keys that are no longer needed because the captured packets corresponding to the ephemeral keys will no longer be stored according to the retention policy. This frees space for storage of other ephemeral keys, which could number in the thousands or tens of thousands.

In addition to the system embodiments, method and computer program product embodiments are also disclosed.

Figure 1:
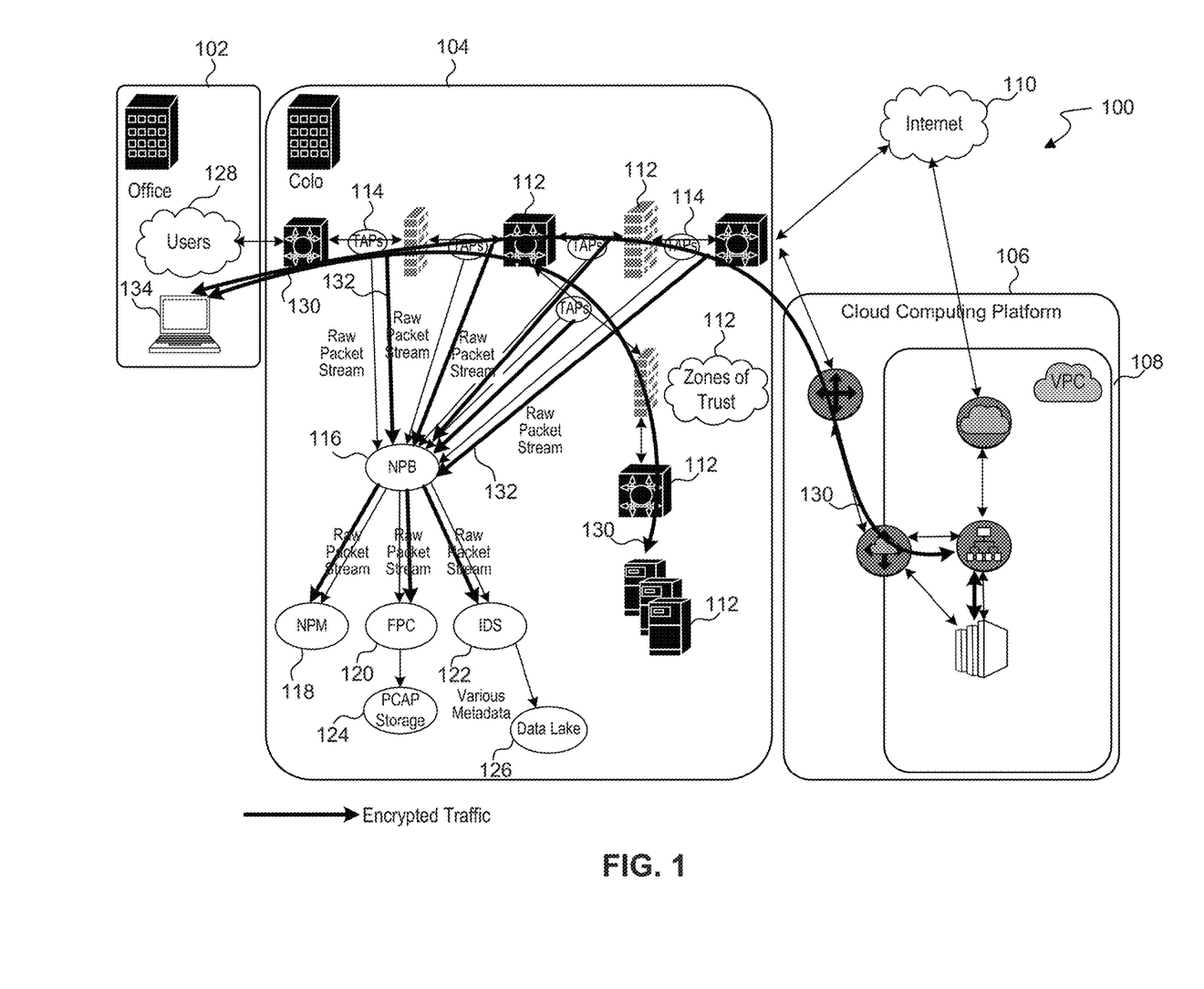
FIG. 1 is a network diagram showing encrypted network traffic flows to a network packet broker and network monitoring devices according to some embodiments disclosed herein.

FIG. 1 is a network diagram showing network management infrastructure 100. A network management infrastructure 100 is a set of devices distributed across various network locations and used to monitor and manage a computer network. Network management infrastructure 100 includes an office location 102 and a colocation center 104 connected to a virtual private cloud 108 hosted on a cloud computing platform 106. The office location 102 represents a site where users 128 use endpoint devices to access the network. A colocation center 104 is a data center where network equipment and storage space are made available for rental to customers. A cloud computing platform 106 is a platform where computing resources are made available on-demand. A virtual private cloud 108 is a pool of computing resources available on a cloud computing platform 106 and can be isolated from other users of the cloud computing platform 106.

The virtual private cloud 108 may be connected to the colocation center 104 and the office location 102 through the internet 110. The office location 102 may comprise users 128 and terminals 134, and the colocation center 104 may comprise various zones of trust 112, network sensors 114, and network monitoring tools 116, 118, 120, 122. A zone of trust 112 is a set of system resources that are treated with the same level of security and access controls. A network sensor 114 may be a network terminal access point (TAP), a firewall log, or anything that collects information about network traffic 130 flows. Network traffic 130 flows between the office location 102, and various zones of trust 112 in the colocation center 104 and the virtual private cloud 108.

As a non-limiting example, encrypted network traffic may flow through the colocation center 104 and be captured by one or more network sensors 114 as the network traffic traverses various zones of trust 112. The network sensors 114 send a raw packet stream 132, comprising captured packets, to one or more network packet brokers 116 which forward the raw packet stream 132 to other network monitoring devices 118, 120, 122. Network monitoring device 116 is a network packet broker (NPB); network monitoring device 122 is an intrusion detection system (IDS); network monitoring device 120 is a full packet capture (FPC) device; and network monitoring device 118 is a network performance management (NPM) 118 tool. The illustration of FIG. 1 is a non-limiting example, and there is no reason why network sensors 114 and network monitoring devices 116, 118, 120, 122 cannot be deployed at the office location 102 or in the virtual private cloud 108.

Network traffic 130 may include encrypted network traffic 130 and unencrypted network traffic 130. An NPB 116 may tag, filter, replicate, de-duplicate, and load balance the raw packet stream 132. The raw packet stream 132 includes captured packets. Tagging adds metadata to the captured packets, which may include identifying the network segment where the packets came from or other contextual information useful for troubleshooting. Filtering limits captured network traffic 130 to that which is considered relevant to network management. Replication includes copying network traffic 130 from one port to another port. Replication may be used to create identical traffic flows to multiple network monitoring device 116, 118, 120, 122. Deduplication removes duplicate packets from the raw packet stream 132. Load balancing may involve dividing an incoming raw packet stream 132 among multiple network monitoring devices 116, 118, 120, 122.

NPB 116 may distribute the raw packet stream 132 to one or more network monitoring devices 116, 118, 120, 122. The NPM 118 monitors network traffic, tracks and analyzes performance metrics and generates reports on network performance. The FPC tool 120 may store captured packets in packet capture (PCAP) storage 124. The IDS may store relevant captured packets and metadata 226 in a data lake 126. Data lake 126 is a storage archive for after-the-fact forensic analysis of captured traffic. The data lake may include storage on-site, storage located in a colocation facility, or storage provided by a cloud computing platform.

One approach to establishing network visibility of encrypted traffic includes out-of-band (OOB) passive decryption. OOB passive decryption may include management of TLS certificates and deployment of decryption keys 224 on many NPBs 116 and other network monitoring devices 118, 120, 122. Network monitoring devices 116, 118, 120, 122 have limited space for local storage of decryption keys 224. In a large network infrastructure comprising hundreds of network monitoring devices 116, 118, 120, 122, for example, the number of applications running on the network and their corresponding decryption keys 224 may range in the thousands. Managing distribution of decryption keys 224 to the appropriate network monitoring devices 116, 118, 120, 122 in such a network infrastructure can become infeasible for human network operators.

The network management infrastructure 100 illustrated in FIG. 1 lacks a key broker for deploying appropriate decryption keys to the network monitoring devices 116, 118, 120, 122. Decryption keys may be manually deployed to the network monitoring devices 116, 118, 120, 122, but without a key broker, decryption key deployment is not responsive to changes in network traffic 130. Given the finite capacity of the key datastore on the NPB and other network monitoring devices, as traffic diversity increases, requiring a larger number of distinct decryption keys, ensuring the NPB has the decryption keys it needs becomes increasingly difficult.

Figure 2:
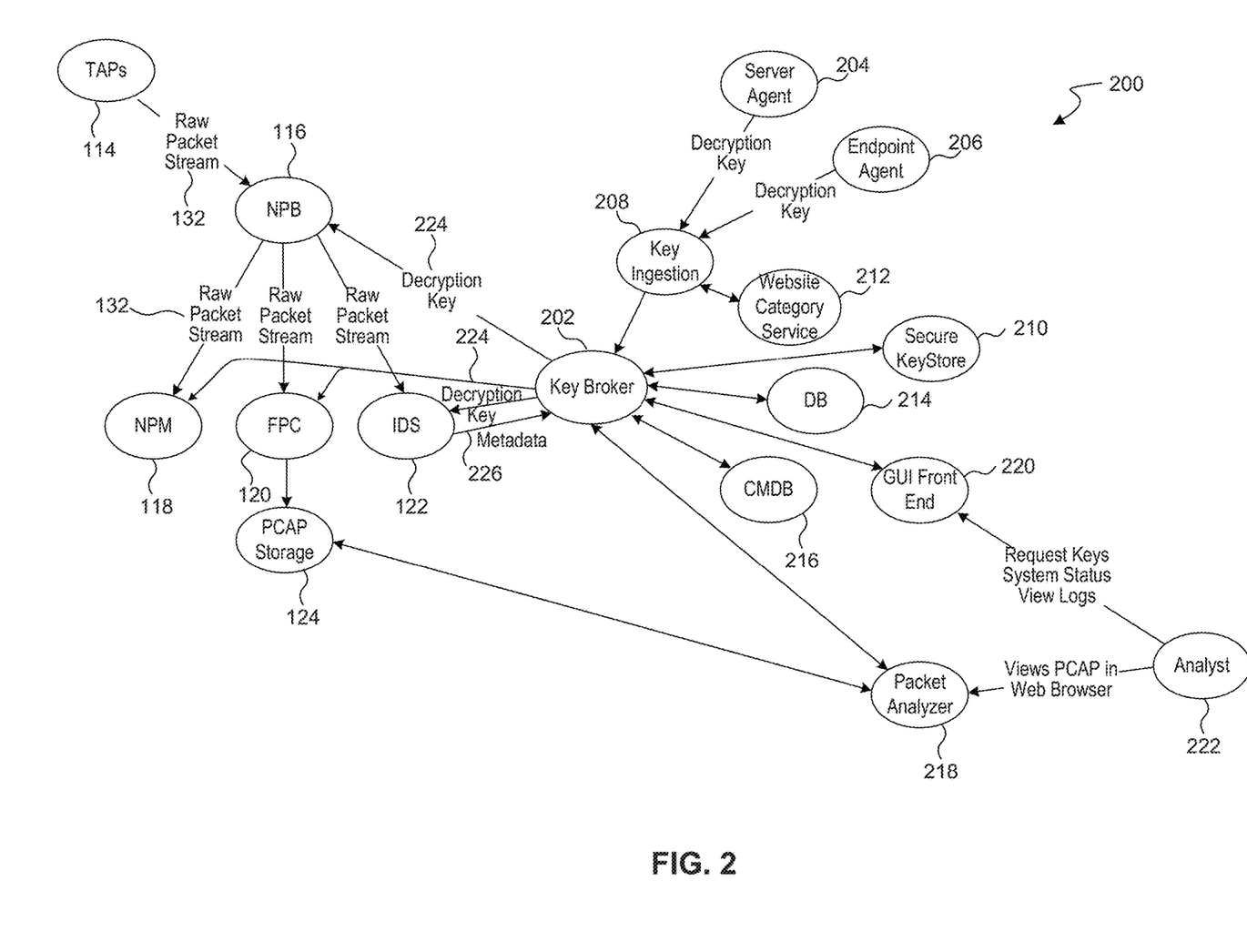
FIG. 2 is a network diagram including a key broker according to some embodiments disclosed herein.

FIG. 2 is a network diagram including a key broker 202 according to some embodiments disclosed herein.

According to some embodiments, a network infrastructure 200 may comprise a key broker 202 configured to receive metadata 226 related to the raw packet stream 132. Metadata 226 may include information that can be used to identify the security certificate corresponding to a captured packet. Metadata 226 may include domain information, an unencrypted portion of a network packet, or an identifier of a security certificate corresponding to the decryption key 224. Metadata may also include information regarding how the packets were captured, the network site and network device where the packets were captured, information related to filters that were applied to the captured network traffic, and any other contextual information related to the captured packets. According to some embodiments, the metadata 226 corresponding to a packet may include one or more of SSL/X.509 certificate data, a source IP address, a source port, a destination IP address, a destination port, server name indication (SNI) field, common name (CN) field, and/or a subject alternative name (SAN), a timestamp, a site (e.g., office 102, colocation center 104, virtual private cloud 108), a network sensor 114 name, and a network monitoring device 116, 118, 120, 122 name.

The IDS may be configured to generate metadata 226. Metadata 226 generated by the IDS may include a SNI from a network packet, CN, and/or SAN entry in X.509 certificates corresponding to encrypted network traffic 130 flowing over the network infrastructure 200. The IDS may access a list of domains that belong to an entity, check for Transport Layer Security (TLS) certificates issued by the entity's intermediate and root certificate authorities, or check for TLS certificates that contain the domains in the CN or SAN fields of the TLS certificate. If captured packets match the list of domains or if the TLS certificate was issued by the entity, then the IDS may forward metadata, including the contents of one or more of the SNI, CN, or SAN fields, to the key broker 202.

The key broker 202 may use the metadata 226 to determine which decryption keys 224 are required to decrypt the network traffic 130 in the raw packet stream 132. As a non-limiting example, an X.509 certificate is a digital certificate conforming to the international X.509 public key infrastructure standard used in HTTPS secured web browsing. Included in an X.509 certificate issued to an entity is the decryption key 224 associated with that entity in addition to domain, CN or SAN fields. The key broker 202 may use the metadata 226 received from the IDS to identify a corresponding X.509 certificate and the decryption key 224 corresponding to captured packets.

Based on the metadata 226, the key broker 202 may determine which decryption keys 224 are highest priority and manage the decryption keys 224 stored on the NPB 116 or other network monitoring devices 116, 118, 120, 122. The decryption keys 224 may be made available at an infrastructure level that allows a variety of network monitoring devices 116, 118, 120, 122 to use the decryption keys 224 when necessary. According to some embodiments, a decryption key 224 may be a private key of a public key infrastructure (PKI) key pair.

According to some embodiments, the key broker 202 may obtain the metadata 226 using a publication-subscription model. The key broker 202 may subscribe to topics to which the NPB 116, NPM 118, FPC 120, IDS 122, or other network monitoring devices 116, 118, 120, 122 publish metadata 226 related to the raw packet stream 132. The published metadata 226 may list relevant server name indication (SM) field from encrypted network traffic 130, or a common name (CN) field, or a subject alternative name (SAN) in X.509 certificates of encrypted network traffic 130 flowing over the network infrastructure 200. According to some embodiments, the key broker 202 can obtain the metadata 226 by querying the data lake 126 for SNI, CN, or SAN information from various network monitoring devices 116, 118, 120, 122. According to some embodiments, the packet broker may query SNI, CN, and/or SAN information from network monitoring devices 116, 118, 120, 122 and push the corresponding decryption keys 224 to the appropriate network monitoring devices 116, 118, 120, 122.

According to some embodiments, one or more key agents 204, 206 of the network infrastructure 200 may be configured to provide decryption keys 224 to the key broker 202 through a key ingestion 208 service. The key agents may include a server agent 204 and an endpoint agent 206. The decryption keys 224 provided by the key agents 204, 206 may include Diffie-Hellman ephemeral keys. Diffie-Hellman ephemeral keys are decryption keys 224 corresponding to network traffic under the TLS 1.3 standard. According to some embodiments, the key agents 204, 206 may be configured to send decryption keys 224 to the key ingestion 208 service. According to some embodiments, the key agents 204, 206, may be configured to deposit decryption keys 224 in the secure keystore 210.

Storing the decryption keys 224 in the secure keystore 210, even when the decryption keys 224 may no longer be deployed to network monitoring devices 116, 118, 120, 122, enables analysis, such as after-the-fact, root-cause, or forensic analysis to be performed on captured network traffic. Decryption keys 224 stored in the secure keystore 210 may be associated with a time-to-live (TTL). The TTL of decryption keys stored in the secure keystore 210 may indicate an amount of time that the decryption keys 224 should be retained in the secure keystore 210 in order to enable analysis of traffic flows to be performed on captured packets by network monitoring tools 116, 118, 120, 122 or packet analyzer software 218. The key broker 202 may set the TTL of decryption keys based on a retention policy for captured network traffic. The retention policy may define an amount of time that captured network traffic should be stored before deletion. The key broker 202 may delete decryption keys 224 from the secure keystore 210 after expiration of the TTL associated with the decryption keys 224.

A website category service 212 may be configured to identify encrypted network traffic 130 that should not be decrypted, or decryption keys 224 that should not be retained according to a privacy policy. For example, the privacy policy may identify health care traffic or personal banking website traffic as encrypted network traffic 130 that should not be decrypted. The website category service 212 may use key metadata to determine the destination website associated with each decryption key 224 and determine whether to ingest or drop the key based on the privacy policy. The server agent 204 and the endpoint agent 206 may be further configured to provide the key metadata related to the decryption keys 224. The key metadata sent by the server agent 204 and the endpoint agent 206 may also be used by the key broker 202 to determine which NPB 116 or network monitoring devices 116, 118, 120, 122 to deploy the decryption keys 224 to.

According to some embodiments, the key ingestion service 208 may be configured to send decryption keys 224 to be ingested based on the privacy policy to the key broker 202. According to some embodiments, the key ingestion service 208 may be configured to send decryption keys 224 to be ingested based on the privacy policy to the secure keystore 210.

Decryption keys 224, including RSA keys and decryption keys 224 received from the server agent 204 or endpoint agent 206, may be stored in a secure keystore 210. According to some embodiments, the secure keystore 210 comprises offline storage. The secure keystore 210 may be configured to encrypt data at rest and to encrypt data in transit. In this way, the decryption keys 224 and other sensitive data related to the decryption keys is protected from security breaches. The key broker 202 may check out or lease decryption keys 224 from the secure keystore 210 for a limited time on the behalf of the NPBs 116 and other network monitoring devices 118, 120, 122. As a non-limiting example, decryption keys 224 may be checked out for 24, 48, or 72 hours or some configurable amount of time. According to some embodiments, the key broker 202 may renew the lease on decryption keys 224 if network traffic 130 matching those decryption keys 224 has flowed over the network sensors 114 in the past day or some configurable amount of time. According to some embodiments, a decryption key 224 may be checked out indefinitely.

The secure keystore 210 may include partitions configured to prevent retrieval or writing of the private keys through side channels. The combination of a strict lease time with a single-channel write enables frequent key rotation, reduces unnecessary exposure of the decryption keys 224 that would result from storing un-used decryption keys 224 on network monitoring devices 116, 118, 120, 122, and helps to ensure that deployed decryption keys 224 are well matched to the requirements for decrypting the encrypted network traffic 130.

The network infrastructure 200 may be configured to maintain an asset list comprising sites (e.g., office 102, colocation center 104, virtual private cloud 108) and associated NPBs 116 and network monitoring devices 116, 118, 120, 122 deployed throughout the network infrastructure 200. Any of the network sensors 114, network monitoring devices 116, 118, 120, 122, server agents 204, endpoint agents 206, and other network assets may be configured to report when they are active in order to facilitate creating a dynamic asset list. The asset list may be stored in a configuration management database (CMDB) 216. The key broker 202 may be configured to store tracking data in a tracking database 214. The tracking data may be related to which decryption keys 224 have been deployed to which set of NPBs 116 and network monitoring devices 116, 118, 120, 122 along with the lease time of the associated decryption key 224. Tracking data may comprise an identifier of the decryption key 224 and an identifier of the network monitoring device. According to some embodiments, the CMDB and the tracking database may be combined as a single database.

In some embodiments, an identifier may be a community ID. A community ID may be a way to generate a unique identifier for a data flow. For example, a community ID may be generated by taking a seeded hash of a five-tuple, including the source IP address, destination IP address, source port, destination port and the transport protocol. In some embodiments, the seeded hash may be compressed and a version number for the identifier may be added. The community ID should also be referenced to identify and correlate packet capture files with ephemeral keys or other types of keys.

According to some embodiments, a GUI frontend 220 may be configured to interface with the key broker 202 to provide a human operator, such as a cyber-security operations center (CSOC) analyst 222 with the ability to check out decryption keys 224 for a given time duration. Checked-out decryption keys 224 may be used in after-the-fact, root-cause, or forensic analysis in packet analyzer software 218. The time duration for which decryption keys 224 may be checked out may be limited and the set of authorized human or machine analysts 222 to whom decryption keys 224 can be checked out may be limited to reduce risk of exposing the decryption keys 224. According to some embodiments, the key broker 202 may create an audit trail by storing data related to checked-out decryption keys. The key broker 202 may store tracking data that logs which analysts 222 checked out which decryption keys 224, how long decryption keys 224 were checked out, and the number of times a decryption key 224 was checked out. Each instance of a decryption key 224 being checked out or deployed to a network monitoring device 116, 118, 120, 122 may be recorded in the tracking data. An audit trail for a particular decryption key 224 or set of decryption keys 224, a particular analyst 222, or one or more network monitoring devices 116, 118, 120, 122 may be generated based on the tracking data.

According to some embodiments, the key broker 202 may make a checked-out decryption key 224 available to a packet analyzer 218 without making the decryption key 224 directly available to the analyst 222. The packet analyzer 218 may use the decryption key 224, received from the key broker 202, to provide the analyst 222 with visibility into the decrypted network traffic without making the decryption key 224 accessible to the analyst 222.

Figure 3:
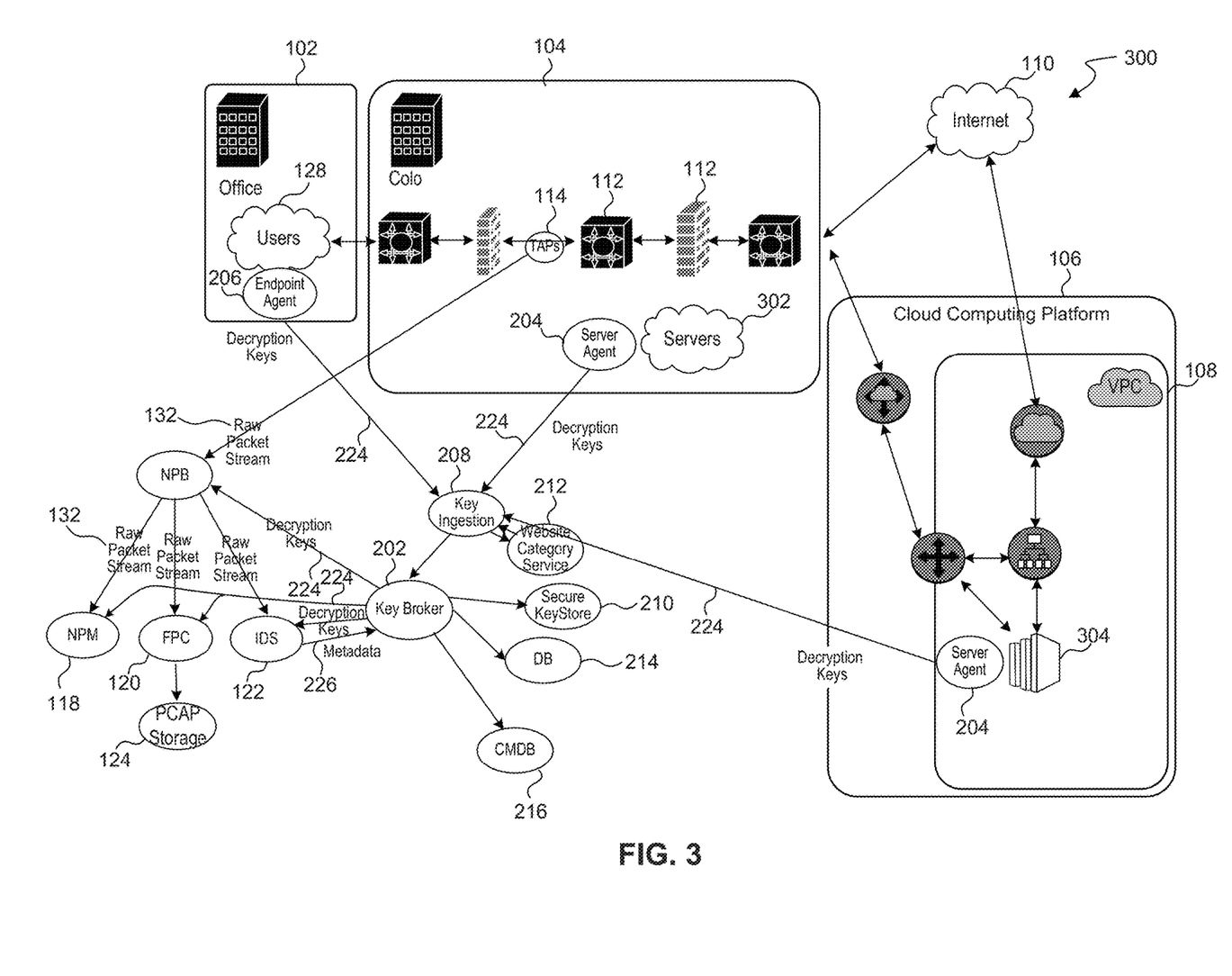
FIG. 3 is a network diagram including a key broker, an endpoint agent, and server agents at a colocation center and a cloud data center according to some embodiments disclosed herein.
Figure 4:
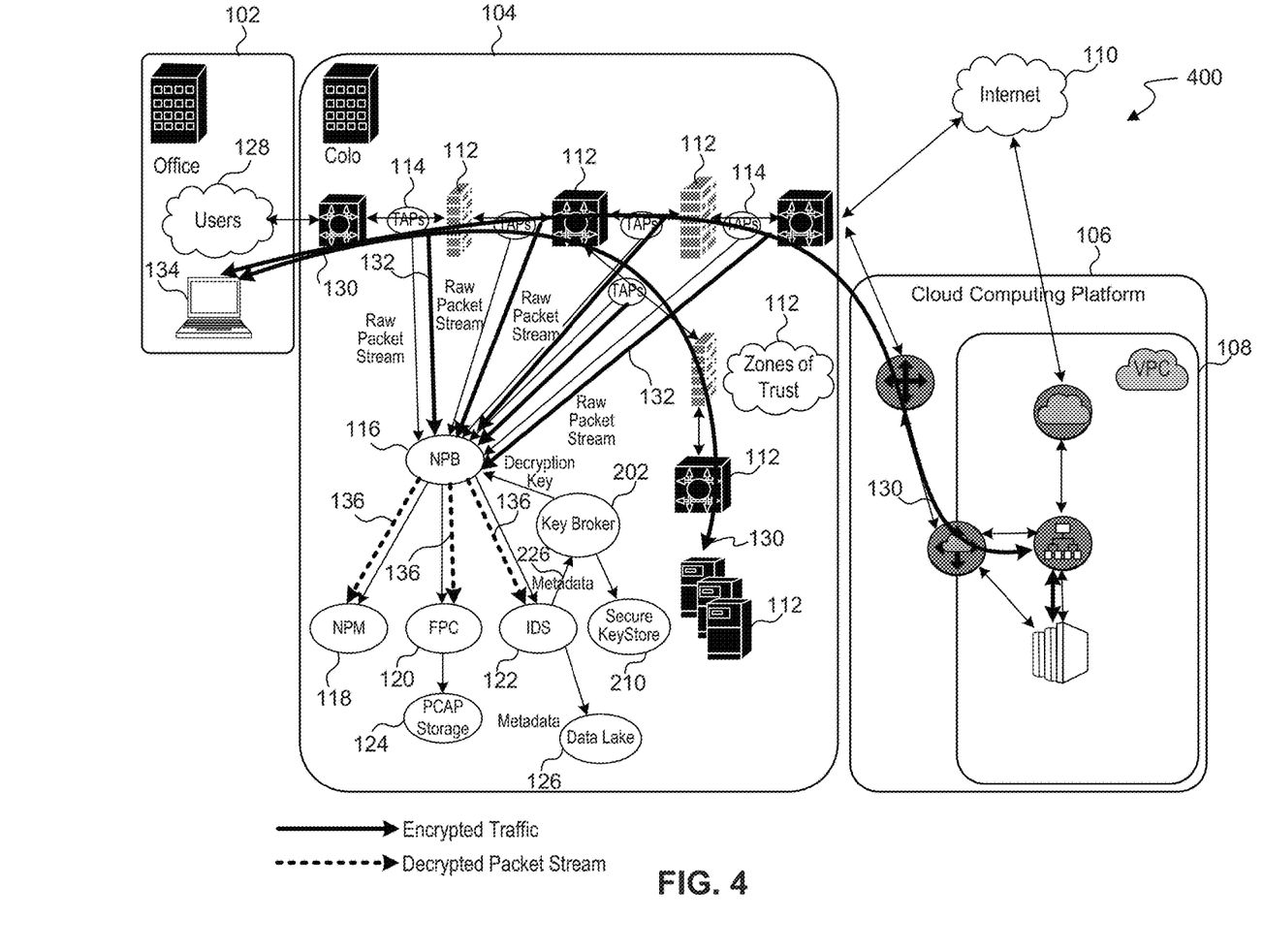
FIG. 4 is a network diagram illustrating a key broker, raw packet streams flowing to a network packet broker, and decrypted packet streams flowing to network monitoring devices according to some embodiments disclosed herein.

A network infrastructure may have a significant deployment of network sensors 114. Data collected by network sensors 114 can be used by network operators or network monitoring devices 116, 118, 120, 122 to assess network security, respond to security threats and performance issues, or make adjustments to the network infrastructure 200, 300, 400 or management policies. According to some embodiments, network sensors 114 may include passive or inline bypass TAPs, including virtual TAPs. Network sensors 114 may operate in a cloud computing platform 106, in one or more of an on-premise colocation center 104, in a cloud data center, or in legacy data center facilities. Network sensors 114 may feed network traffic, ingressing and egressing various zones of trust 112 and critical points in the network infrastructure, into a NPB fabric.

The NPB fabric may comprise multiple NPBs 116 distributed at various points of the network infrastructure 200. The NPB fabric may tag, filter, replicate, deduplicate, and load balance network traffic among multiple network monitoring devices 116, 118, 120, 122. The majority of traffic that the network monitoring devices 116, 118, 120, 122 process, filter, rate limit or store is HTTPS/TLS traffic that contains encrypted payloads. A full packet capture 120 solution may have petabytes of packet level data that contain encrypted payloads. An inability of network monitoring devices 116, 118, 120, 122 to view the encrypted payload can interfere with real-time metadata 226 generation, real-time analysis of network traffic, and forensic analysis after discovering security anomalies.

According to some embodiments disclosed herein, a key broker 202 provides a method and apparatus for in-band network signaling of encrypted traffic flows to facilitate secure, dynamic, intelligent, passive decryption of network flows for monitoring network security. A key broker 202 of the disclosed embodiments may facilitate distribution of the appropriate decryption keys 224 to network monitoring devices 116, 118, 120, 122 for decryption of network traffic flows. A key broker 202 of the disclosed embodiments may use metadata 226 from network traffic flows crossing relevant inline and out-of-band monitoring infrastructure, such as network sensors 114, NPBs 116, and network monitoring devices 116, 118, 120, 122. The key broker 202 may use the metadata 226 to determine which decryption keys 224 need to be distributed to which NPBs 116 in order to send decrypted traffic to the network monitoring devices 116, 118, 120, 122.

In this way, embodiments disclosed herein enable secure, dynamic, and intelligent automated on-the-fly passive out-of-band decryption of at least TLS 1.2 and TLS 1.3 traffic in physical on-premise colocation center 104, data center, and/or a cloud computing environment. The disclosed embodiments also enable secure, dynamic, and intelligent on-demand after-the-fact decryption of TLS 1.2 and TLS 1.3 encrypted network traffic in forensic analysis tools and other available open-source or commercial tools.

FIG. 3 is a network diagram including a key broker 202, an endpoint agent 206, and server agents at 204 a colocation center 104 and a cloud data center according to some embodiments disclosed herein.

FIG. 3 illustrates a network infrastructure 300 with a combination of some of the components illustrated in FIG. 1 or FIG. 2. According to some embodiments, one or more endpoint agents 206 may be deployed at an office location 102, and one or more server agents 204 may be deployed on servers 302 at a colocation center 104 or virtual servers 304 in a virtual private cloud 108 hosted on a cloud computing platform 106.

Network sensors 114 distributed between various zones of trust 112 may be configured to copy network traffic 130 and send a raw packet stream 132 to one or more network monitoring devices 116, 118, 120, 122. According to some embodiments, the network sensors 114 are configured to send the raw packet stream 132 to a network packet broker (NPB) 116.

According to some embodiments, an endpoint agent 206 may be installed on a user's terminal 134 and configured to monitor network traffic 130 at the user's terminal 134. The endpoint agent 206 may be configured to identify decryption keys 224 available to the user terminal 134 and send the decryption keys 224 to key ingestion 208. The endpoint agent 206 may also send key metadata with the decryption keys 224. The endpoint agent 206 may be configured to provide decryption keys 224 and key metadata passively and out-of-band.

The server agent 204 may be installed at a server in the colocation center 104 or a virtual private cloud 108 and configured to monitor network traffic 130 at the server. The server agent 204 may be configured to identify decryption keys 224 available to the server and send the decryption keys 224 to key ingestion 208. The server agent 204 may also send key metadata with the decryption keys 224. The server agent 204 may be configured to provide decryption keys 224 and key metadata passively and out-of-band. A website category service 212 may apply a privacy policy, using the key metadata associated with the decryption keys 224, to determine which packets of the raw packet stream 132 should not be decrypted. The server agent 204 and endpoint agent 206 may be configured to send Diffie-Hellman ephemeral keys to key ingestion 208, to the key broker 202, or to the secure keystore 210.

FIG. 4 is a network diagram illustrating a key broker 202, raw packet streams 132 flowing to a network packet broker 116, and decrypted packet streams 136 flowing to network monitoring devices 118, 120, 122 according to some embodiments disclosed herein.

FIG. 4 comprises elements from FIG. 1 and a representation the NPB 116 receiving a raw packet stream 132 and sending a decrypted packet stream 136 to the NPM 118, the FPC 120, and the IDS 122 of the network infrastructure 400. According to some embodiments, the key broker 202 is configured to receive metadata 226 from the IDS.

According to some embodiments, as the network traffic 130 flows across the network, network sensors 114 receive the network traffic 130 and feed a raw packet stream 132 to an NPB 116. According to some embodiments, the network sensors 114 comprise passive optical terminal access points (TAPs). The NPB 116 may be configured to tag, filter, replicate, deduplicate, and load balance network traffic 130 among a large number network monitoring devices 116, 118, 120, 122, including one or more intrusion detection systems (IDS) 122, full packet capture (FPC) 120 tools, or network performance management (NPM) 118 tools.

The IDS 122 may be configured to reassemble the raw packet stream 132. The IDS 122 may be further configured to parse the reassembled raw packet stream 132 using different protocol dissectors. The IDS 122 may be further configured to log the network traffic 130 and generate metadata 226 about the network traffic 130 flow. The metadata 226 corresponding to a packet or the network traffic 130 may comprise one or more of SSL/X.509 certificate data, a source IP address, a source port, a destination IP address, a destination port, SNI, CN, and/or SAN entry, a timestamp, a site (e.g., office 102, colocation center 104, virtual private cloud 108), and a network sensor name.

According to some embodiments, the IDS may send the metadata 226 to the key broker 202. According to some embodiments, the IDS may be configured to publish the metadata 226 to a topic in a messaging system, and the key broker 202 may be configured to listen to the topic. According to some embodiments, the IDS may store the metadata 226 in a data lake 126, and the key broker 202 may be configured to query the data lake 126 to obtain the metadata 226 related to the raw packet stream 132.

The key broker 202 may be configured to maintain an asset list comprising sites (e.g., office 102, colocation center 104, virtual private cloud 108) and associated network sensors 114, NPBs 116, and other network monitoring devices 118, 120, 122 deployed in the network infrastructure 200, 300, 400. The asset list may be stored in a CMDB 216.

According to some embodiments, the key broker 202 may be configured to write metadata 226 from the IDS 122 to a tracking database 214 for reference. The key broker 202 may also be configured to store tracking data in the tracking database 214. The tracking data may be related to which decryption keys 224 have been distributed to which set of NPBs 116 or other network monitoring devices 118, 120, 122. The key broker 202 may also be configured to store a lease time of the distributed decryption keys 224. The tracking data, stored in the tracking database, may comprise the site (e.g., office 102, colocation center 104, virtual private cloud 108), the network monitoring device 116, 118, 120, 122, the decryption key 224, and a lease time indicating the amount of time that the decryption key 224 is valid for the network monitoring device 116, 118, 120, 122.

According to some embodiments, the key broker 202 may be configured to identify a decryption key 224 to be distributed to an identified network monitoring device 116, 118, 120, 122. The distributed decryption key 224 may include a Diffie-Hellman ephemeral key, which enables real-time decryption of a session of TLS 1.3 traffic. The identified network monitoring device 116, 118, 120, 122 may be the network monitoring device 116, 118, 120, 122 that received captured packets capable of being decrypted by the identified decryption key 224. The key broker 202 may check the tracking data in the tracking database 214 to determine whether the identified decryption key 224 has been distributed to the identified network monitoring device 116, 118, 120, 122. The key broker 202 may be configured to reset the lease time of the identified decryption key 224 in the tracking database 214 in response to determining that the decryption key 224 has already been distributed to the identified network monitoring device 116, 118, 120, 122. The key broker 202 may be configured to track and log the number of times the lease time of the identified decryption key 224 was reset. The key broker 202 may be configured to request the identified decryption key 224 from the secure keystore 210 in response to determining that the decryption key 224 has not already been distributed to the identified network monitoring device 116, 118, 120, 122. The secure keystore 210 may be configured to provide the requested decryption key 224 to the key broker 202. According to some embodiments, the key broker 202 may be configured to send the identified decryption key 224 to the identified network monitoring device 116, 118, 120, 122 via script or an application programming interface (API).

According to some embodiments, the identified network monitoring device 116, 118, 120, 122 may be configured to decrypt future network traffic 130 associated with the identified decryption key 224 received from the key broker 202. As a non-limiting example, the NPB 116 in FIG. 4 is illustrated receiving encrypted network traffic 130 in the raw packet stream 132, and sending a decrypted packet stream 136 to the NPM 118, FPC 120, and IDS 122. According to some embodiments, the identified network monitoring device 116, 118, 120, 122 may be configured to decrypt encrypted network traffic 130, sent from other network monitoring devices 116, 118, 120, 122 or from PCAP storage 124.

Figure 5:
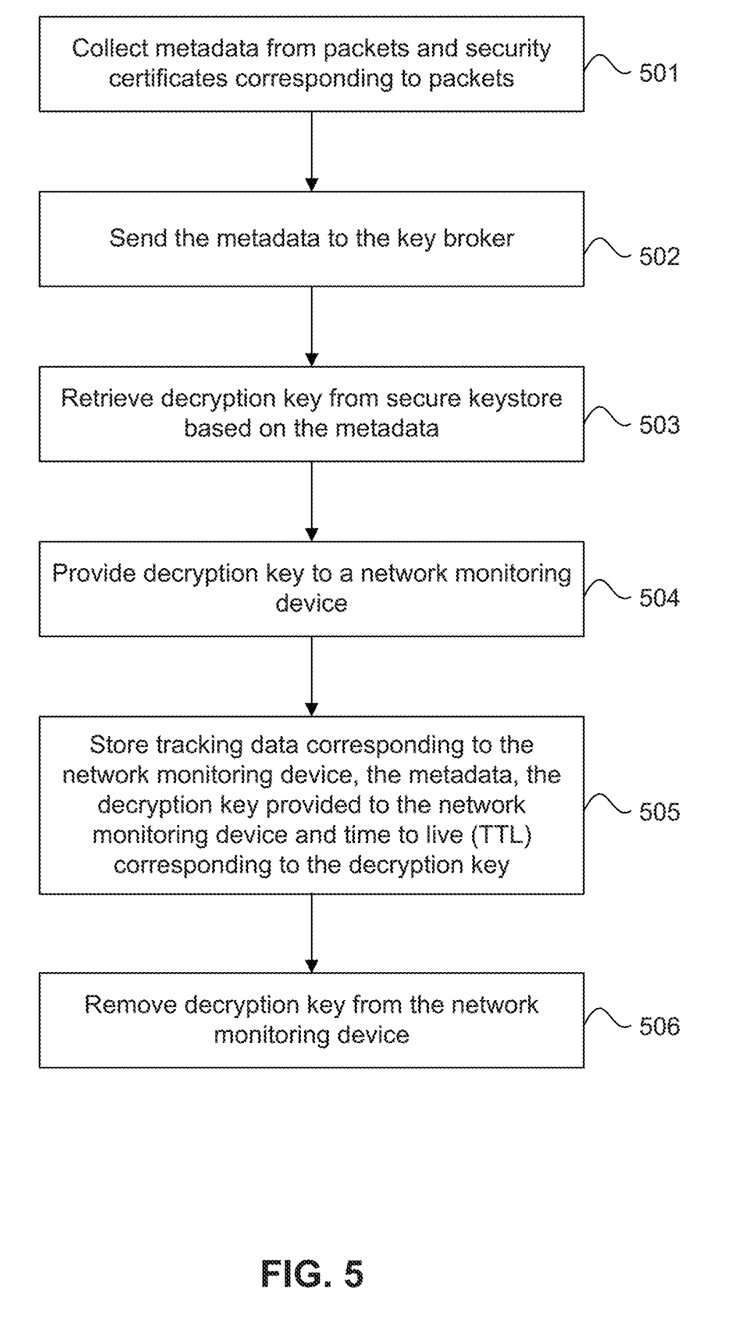
FIG. 5 is a flowchart illustrating steps of a key broker managing encryption keys provided to network monitoring devices according to some embodiments disclosed herein.

FIG. 5 is a flowchart illustrating steps of a key broker 202 managing distribution of decryption keys 224 to network monitoring devices 116, 118, 120, 122 according to some embodiments disclosed herein. The steps disclosed may be performed by one or more of the key broker 202, or any network monitoring devices 116, 118, 120, 122, including, but not limited to a network packet broker 116, a network performance management (NPM) tool 118, a full packet capture (FPC) tool 120, or an intrusion detection system (IDS) 122. Each of the components may be implemented using a processor and memory according to embodiments disclosed herein.

At step 501, one or more processors collect metadata 226, corresponding to packets, from security certificates. According to some embodiments, the metadata 226 comprises domain information retrieved from network traffic 130 by examining information found in SNI fields in the TLS client hello, Common Name (CN) or Subject Alternative Name (SAN) fields in X.509 certificates of encrypted network traffic 130. Metadata 226 may also include information regarding how the packets were captured, the network site and network device where the packets were captured, information related to filters that were applied to the captured network traffic, and any other contextual information related to the captured packets.

Secured network traffic 130 under HTTPS/TLS may include a TLS handshake. Embedded in the TLS handshake of traffic flowing across the network is the unencrypted destination of the HTTPS/TLS endpoint. The destination may include domain information (e.g., application.capitalone.com) associated with an entity. According to some embodiments, the IDS 122 may access a list of domains (e.g., *.capitalone.com, *.cb4good.com, etc.) that belong to the entity and check for TLS certificates issued by the entity's intermediate or root certificate authorities. The IDS 122 may also check for TLS certificates, returned by the server, that contain domain information of the entity in the CN or SAN fields.

At step 502, the one or more processors may send the metadata 226 to the key broker 202. The metadata may comprise domain information, such as the contents of the SNI from a network packet, or CN, or SAN fields from security certificates. The IDS 122 may forward, to the key broker 202, the metadata for network traffic 130 matching the list of domains or network traffic 130 corresponding to the SSL certificate issued by the entity. The key broker 202 may write the metadata from the IDS to a tracking database 214 for reference.

At step 503, the key broker 202 may retrieve a decryption key 224 from the secure keystore 210. The key broker 202 may request the decryption key 224 from the secure keystore 210. The requested decryption key 224 may be a decryption key 224 related to the network traffic 130 corresponding to the collected metadata 226.

The key broker 202 may access the tracking data to determine whether a decryption key 224 corresponding to the metadata 226 has already been deployed to one or more network monitoring devices 116, 118, 120, 122. In response to determining that the decryption key 224 has already been distributed to one or more network monitoring devices 116, 118, 120, 122, the key broker 202 may reset the lease time value associated with the decryption key 224. In response to determining that the decryption key 224 has not already been deployed to one or more network monitoring devices 116, 118, 120, 122, the key broker 202 may request the decryption key 224 from the secure keystore 210. If the requested decryption key 224 is available, the secure keystore 210 may send the requested decryption key 224 back to the key broker 202.

At step 504, the key broker 202 may distribute the decryption key 224, received or retrieved from the secure keystore 210, to one or more network monitoring devices 116, 118, 120, 122. The network monitoring device 116, 118, 120, 122 to which the decryption key 224 is distributed may be the network monitoring device that received the captured packet corresponding to the decryption key 224. According to some embodiments, the key broker 202 may send the decryption key 224 to a NPB 116. The key broker 202 may send the decryption key 224 over TLS to the one or more network monitoring devices 116, 118, 120, 122 via a script. According to some embodiments, the key broker 202 may send the decryption key 224 to the one or more network monitoring devices 116, 118, 120, 122 through an API, SCP transfer, or another secure mechanism. The one or more network monitoring devices 116, 118, 120, 122 to which the decryption key 224 is sent can decrypt future traffic associated with that decryption key 224, send a decrypted packet stream 136 to other tools, and/or decrypt PCAP files sent from other network monitoring devices 116, 118, 120, 122 that were previously not decrypted.

At step 505, the key broker 202 may store tracking data corresponding to the distributed decryption key 224. The tracking data may be stored in a tracking database 214. The tracking data may comprise the network monitoring device 116, 118, 120, 122 to which the decryption key 224 was distributed, the site where the network monitoring device is deployed, the metadata 226 corresponding to the decryption key 224, an identifier of the decryption key 224, and a lease time value for the decryption key 224. The lease time value may identify a length of time that the decryption key 224 is valid for deployment on the network monitoring device 116, 118, 120, 122.

According to some embodiments, the key broker 202 may maintain an asset list comprising sites and associated NPBs 116 and network monitoring devices 118, 120, 122 deployed in the network infrastructure 200, 300, 400. The asset list may be stored in a configuration management database (CMDB) 216.

At step 506, the key broker 202 may remove the distributed decryption key 224 from the network monitoring device 116, 118, 120, 122. The key broker 202 may remove the decryption key 224 from the network monitoring device in response to expiration of the lease time. In this way, the key broker 202 may enforce the decryption key 224 lease or check out mechanism by pushing decryption keys 224 to the one or more network monitoring devices 116, 118, 120, 122, and removing the decryption keys 224 from the one or more network monitoring devices 116, 118, 120, 122. Removing the decryption key 224 from the network monitoring device 116, 118, 120, 122 also reduces exposure of the security keys to a potential security breach. The key broker 202 may rotate decryption keys 224 that are distributed to network monitoring devices 116, 118, 120, 122 as security certificates and their corresponding decryption keys 224 near their expiration date and are renewed or have new decryption keys 224 generated.

Figure 6:
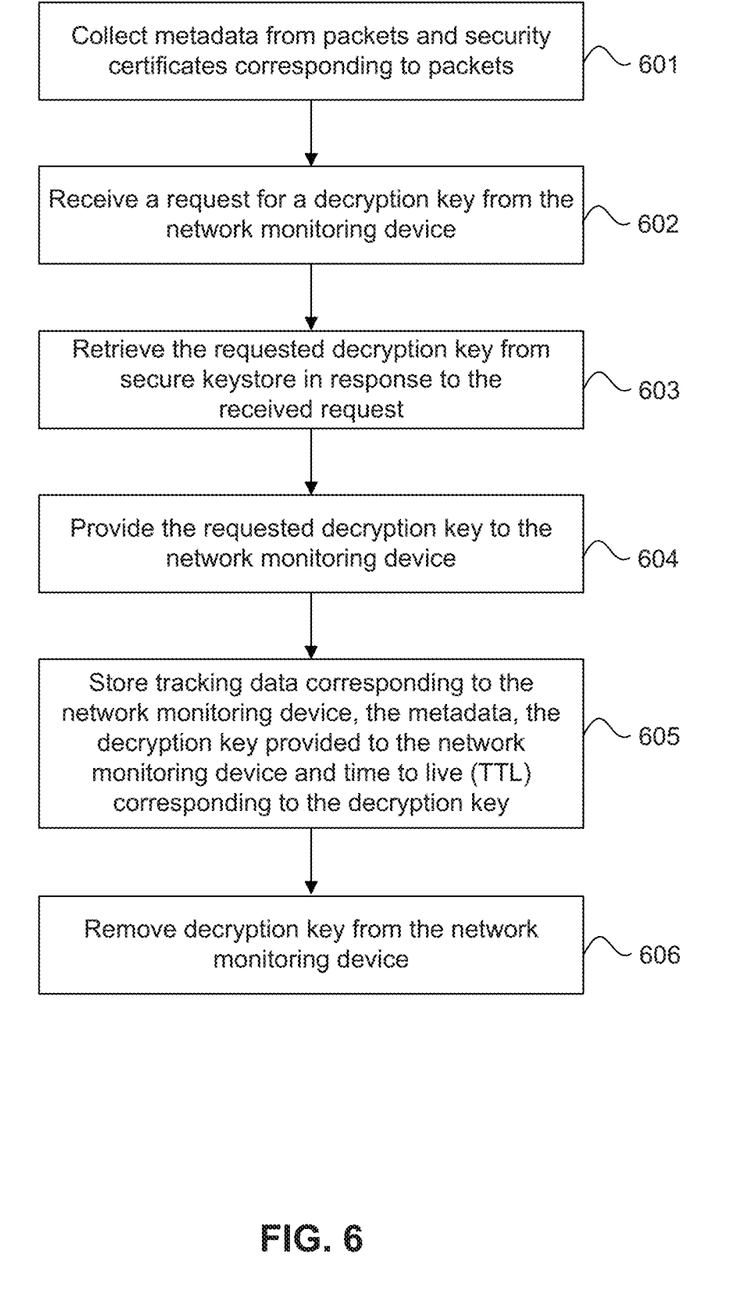
FIG. 6 is a flowchart illustrating steps of a key broker providing an encryption key to a network monitoring device, in response to a request, according to some embodiments disclosed herein.

FIG. 6 is a flowchart illustrating steps of a key broker 202 providing an encryption key to a network monitoring device, in response to a request, according to some embodiments disclosed herein.

At step 601, one or more processors may collect metadata 226 corresponding to packets. The metadata 226 may be found in the security certificates corresponding to the packets, or in a TLS handshake. Collecting metadata 226 may be performed according to any of the embodiments disclosed herein.

At step 602, the key broker 202 may receive a request for a decryption key 224 from a network monitoring device 116, 118, 120, 122. According to some embodiments, the key broker 202 may be configured to support intelligent network monitoring devices 116, 118, 120, 122 by responding to requests for decryption keys 224. The network monitoring device 116, 118, 120, 122 may be an intelligent device configured to identify decryption keys 224 corresponding to a raw packet stream 132 that the network monitoring device 116, 118, 120, 122 receives from network sensors 114. A network monitoring device 116, 118, 120, 122 may request a decryption key 224 via an API call based on locally processing relevant SNI fields in the TLS Client Hello, CN, and/or SAN fields in X.509 Certificates of encrypted network traffic 130. According to some embodiments, a plug-in for an open source IDS 122 may parse for relevant hostnames in the SNI field of TLS Client Hellos during TLS handshakes and make an API request to the key broker 202 for the proper decryption key 224. The key broker 202 may also push decryption keys 224 to the network monitoring device 116, 118, 120, 122.

At step 603, the key broker 202 may retrieve the requested decryption key 224 from the secure keystore 210 in response to the received request. The key broker 202 may request the decryption key 224 from the secure keystore 210. The requested decryption key 224 may be a decryption key 224 related to the network traffic 130 from which the metadata 226 was collected. The secure keystore 210 may send the requested decryption key 224 to the key broker 202.

At step 604, the key broker 202 may provide the requested decryption key 224 to the network monitoring device 116, 118, 120, 122. According to some embodiments, the key broker 202 may send the requested decryption key 224 over TLS to the one or more network monitoring devices 116, 118, 120, 122 via a script. According to some embodiments, the key broker 202 may send the requested decryption key 224 to the one or more network monitoring devices 116, 118, 120, 122 through an API, SCP transfer, or another secure mechanism. The one or more network monitoring devices 116, 118, 120, 122 to which the requested decryption key 224 is sent can decrypt future traffic associated with that decryption key 224, send a decrypted packet stream 136 to other tools, and/or decrypt PCAP files sent from other network monitoring devices 116, 118, 120, 122 that were previously not decrypted.

At step 605, the key broker 202 may store tracking data corresponding to the requested decryption key 224. According to some embodiments, the key broker 202 may maintain an asset list comprising sites and associated network monitoring devices 116, 118, 120, 122 deployed in the network infrastructure 200, 300, 400. The asset list may be stored in a configuration management database (CMDB) 216. The tracking data may comprise the network monitoring device 116, 118, 120, 122 to which the requested decryption key 224 was distributed, the site where the network monitoring device is deployed, the metadata 226 corresponding to the requested decryption key 224, an identifier of the requested decryption key 224, and a lease time for the requested decryption key 224. The lease time may identify a length of time that the requested decryption key 224 is valid for storage on the network monitoring device 116, 118, 120, 122. The tracking data may be stored in a tracking database 214.

According to some embodiments, the key broker 202 may renew a lease time for the requested decryption key 224 in response to the network monitoring device 116, 118, 120, 122 indicating to the key broker 202 that the requested decryption key 224 is still needed. The network monitoring device 116, 118, 120, 122 may indicate that the requested decryption key 224 is still needed by sending a second request for the decryption key 224 to the key broker 202. The key broker 202 may check the lease time for the requested decryption key 224 in the tracking data and reset the lease time in response to the request from the network monitoring device 116, 118, 120, 122.

The key broker 202 may be configured to differentiate between network traffic 130 based on the TLS 1.2 standard RSA private keys and network traffic 130 based on the TLS 1.2 or TLS 1.3 ephemeral keys and set the lease time accordingly. Although RSA private keys may have an expiration time of months or years, and this expiration may be referred to as a time-to-live, the lease time created by the key broker 202 and associated with distributed decryption keys 224 is distinct from this expiration time of RSA keys. Ephemeral keys are typically generated, used, and discarded with a single communications session. According to some embodiments, the lease time of an ephemeral key stored on a network monitoring device 116, 118, 120, 122 may be set to expire in response to the end of the communications session for which the ephemeral key was generated. This differentiation of the lease time based on the type of decryption key 224 (RSA private key or ephemeral key) limits the time duration that a network monitoring device 116, 118, 120, 122 stores decryption keys 224 and limits the network monitoring devices 116, 118, 120, 122 to which the decryption key 224 is deployed, reducing the risk of exposure of decryption keys 224. This mechanism also helps to provide an audit trail.

At step 606, the key broker 202 may remove the requested decryption key 224 from the network monitoring device 116, 118, 120, 122. The key broker 202 may remove the requested decryption key 224 from the network monitoring device in response to expiration of the lease time. The key broker 202 may enforce the decryption key 224 lease or check out mechanism by providing requested decryption keys 224 to the one or more network monitoring devices 116, 118, 120, 122, and removing the decryption keys 224 from the one or more network monitoring devices 116, 118, 120, 122. The key broker 202 may rotate decryption keys 224 that are distributed to network monitoring devices 116, 118, 120, 122 as security certificates and their corresponding decryption keys 224 near their expiration date and are renewed or have new decryption keys 224 generated.

According to some embodiments, the key broker 202 may remove the decryption key 224 from the network monitoring device 116, 118, 120, 122 based on a decryption key 224 storage limit of the network monitoring device 116, 118, 120, 122. The key broker 202 may further remove the decryption key 224 from the network monitoring device based on a priority of the decryption key 224. As network traffic 130 flows change, some decryption keys 224 distributed to the network monitoring device 116, 118, 120, 122 may no longer be required for decrypting network traffic, while other different decryption keys 224 may be required instead. Decryption keys 224 may have differing priorities. As a non-limiting example, decryption keys 224 corresponding to more recent network traffic 130 may have a higher priority. In response to the changes in network traffic 130, the key broker 202 may remove lower priority keys from the network monitoring device 116, 118, 120, 122 and replace them with higher priority keys. The decryption keys 224 that are removed from the network monitoring device 116, 118, 120, 122 may be determined in part based on the storage limits of the network monitoring device 116, 118, 120, 122. The decryption keys 224 that are removed from the network monitoring device 116, 118, 120, 122 may also be determined in part based on an amount of traffic corresponding to the decryption keys 224 of the network monitoring device 116, 118, 120, 122.

According to some embodiments, the key broker 202 may be configured to manage distribution of Diffie-Hellman ephemeral keys under the TLS 1.3 standard finalized in August of 2018. The TLS 1.3 standard removed RSA key exchange and mandated an ephemeral Diffie-Hellman key exchange to enable perfect forward secrecy (PFS). The TLS 1.3 standard impacts how passive out-of-band decryption can be achieved. The key broker 202 may encompass and extend a PKI with the collection, generation, transmission, and or storage of ephemeral keys.

A distributed key broker 202 system may comprise multiple key brokers 202, each positioned in close network proximity to a subset of the network monitoring devices 116, 118, 120, 122 in the network infrastructure. Each key broker 202 may be configured to monitor metadata 226 from encrypted network traffic 130 flowing over the corresponding subset of the network monitoring devices 116, 118, 120, 122. A key broker 202 may receive a decryption key 224, including an ephemeral session key, from a key agent 204, 206 installed on an endpoint terminal 134 that is sending or receiving the network traffic 130 through the network infrastructure 200, 300, 400.

A key broker 202 may be configured to examine the Server Name Indication (SNI) of a packet, and to determine, based on the SNI, whether the network traffic 130 should not be decrypted due to a privacy policy. The key broker 202 may be further configured to flag the ephemeral key for deletion in response to the key broker 202 determining not to decrypt the packet. The distributed key broker 202 system may be configured to provide to network monitoring devices 116, 118, 120, 122 appropriate ephemeral keys for on-demand real-time network traffic 130 decryption for a suspicious on-going TLS 1.3 session. The key broker 202 may be configured to store ephemeral keys in the secure keystore 210 for after-the-fact decryption and forensic analysis of network traffic 130.

Figure 7:
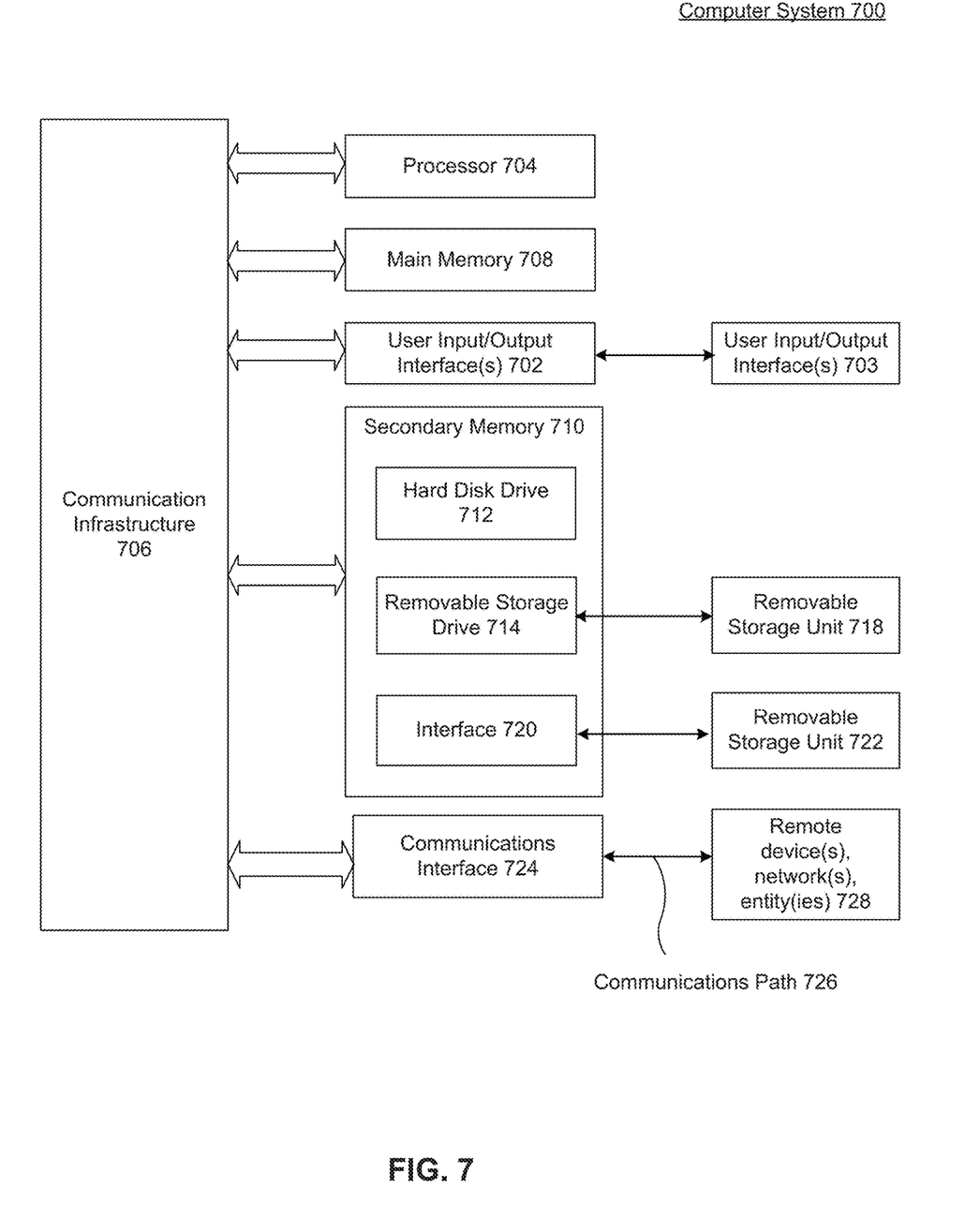
FIG. 7 is a block diagram of an example computer system useful for implementing various embodiments disclosed herein.

FIG. 7 is a block diagram of an example computer system useful for implementing various embodiments disclosed herein.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache and/or registers. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for managing ephemeral keys, the system comprising:
   an agent, comprising computer-executable instructions on an endpoint device or a server that, when executed by a processor, performs operations, the operations comprising:
      passively collect an ephemeral key in response to a transport layer security handshake;
   a memory comprising a secure keystore configured to store the ephemeral key;
   a network terminal access point (TAP) configured to capture a packet on a computer network; and
   a key broker, comprising computer-executable instructions on a server that, when executed by a processor, performs the operations of:
      receive metadata corresponding to the captured packet;
      retrieve the ephemeral key corresponding to the captured packet, from the secure keystore, based on the metadata; and
      provide the ephemeral key to a network monitoring device;

wherein the agent is further configured to send key metadata to a key ingestion service, the key ingestion service configured to:
      receive the ephemeral key and the key metadata;
      examine the key metadata using a website category service; and
      based on the examining of the key metadata, discard the ephemeral key according to a privacy policy or send the ephemeral key for storage in the secure keystore.

2. The system of claim 1, wherein the agent is further configured to send the ephemeral key, through out-of-band communications, to a key ingestion service.

3. The system of claim 1, wherein the key ingestion service is further configured to:
   send the ephemeral key to the key broker for storage in the secure keystore; and
   the key broker is further configured to store the ephemeral key in the secure keystore.

4. The system of claim 1, further comprising:
   a network monitoring device comprising computer-executable instructions on a server that when executed by a processor performs the operations of:
      receive the ephemeral key;
      decrypt the captured packet using the ephemeral key; and
      perform analysis on the captured packet.

5. The system of claim 1, wherein the key broker is further configured to store tracking data corresponding to the network monitoring device, the ephemeral key provided to the network monitoring device, and a lease time.

6. The system of claim 5, wherein the key broker is further configured to remove the ephemeral key from the network monitoring device in response to expiration of the lease time.

7. The system of claim 1, wherein the key broker is further configured to delete the ephemeral key from the secure keystore based on a retention policy of the captured packet corresponding to the ephemeral key.

8. A method of managing ephemeral keys in a network environment, the method comprising:
   passively collecting, through one or more agents running on an endpoint or a server, an ephemeral key in response to a transport layer security handshake;
   sending the ephemeral key, using out-of-band communications, to a secure keystore for storage;
   capturing an encrypted packet on a computer network comprising the endpoint or the server, wherein the packet is encrypted using the ephemeral key;
   receiving, using one or more processors, a request comprising metadata corresponding to the captured packet, from a network monitoring device;
   retrieving the ephemeral key corresponding to the captured packet, from the secure keystore, based on the metadata; and
   providing the ephemeral key to the network monitoring device;
   generating key metadata corresponding to the ephemeral key;
   examining the key metadata using a website category service; and
   based on the examining of the key metadata, discarding the ephemeral key according to a privacy policy or storing the ephemeral key in the secure keystore.

9. The method of claim 8, further comprising:
   decrypting the captured packet using the ephemeral key; and
   performing analysis on the captured packet.

10. The method of claim 8, further comprising:
storing tracking data corresponding to the network monitoring device, the ephemeral key provided to the network monitoring device, and a lease time.

11. The method of claim 10, further comprising:
removing the ephemeral key from the network monitoring device in response to expiration of the lease time.

12. The method of claim 8, further comprising:
deleting the ephemeral key from the secure keystore based on a retention policy of the captured packet corresponding to the ephemeral key.

13. A non-volatile computer-readable device storing instructions that, when executed by a processor, cause the processor to perform method steps comprising:
passively collecting, through one or more agents running on an endpoint or a server, an ephemeral key in response to a transport layer security handshake;
sending the ephemeral key, using out-of-band communications, to a secure keystore for storage;
capturing an encrypted packet on a computer network comprising the endpoint or the server, wherein the packet is encrypted using the ephemeral key;
receiving, using one or more processors, a request comprising metadata corresponding to the captured packet, from a network monitoring device;
retrieving the ephemeral key corresponding to the captured packet, from the secure keystore, based on the metadata; and
providing the ephemeral key to the network monitoring device;
generating key metadata corresponding to the ephemeral key;
examining the key metadata using a website category service; and
based on the examining of the key metadata, discarding the ephemeral key according to a privacy policy or storing the ephemeral key in the secure keystore.

14. The non-volatile computer-readable device of claim 13, wherein the method steps further comprise:
decrypting the captured packet using the ephemeral key; and
performing analysis on the captured packet.

15. The non-volatile computer-readable device of claim 13, wherein the method steps further comprise:
storing tracking data corresponding to the network monitoring device, the ephemeral key provided to the network monitoring device, and a lease time.

16. The non-volatile computer-readable device of claim 15, wherein the method steps further comprise:
removing the ephemeral key from the network monitoring device in response to expiration of the lease time.

17. The non-volatile computer-readable device of claim 13, wherein the method steps further comprise:
deleting the ephemeral key from the secure keystore based on a retention policy of the captured packet corresponding to the ephemeral key.

\* \* \* \* \*